(12) United States Patent
Harrington (10) Patent No.: US 8,152,610 B2
(45) Date of Patent: Apr. 10, 2012

(54) WEED AND VOLUNTEER CROP SEED DESTRUCTION

(75) Inventor: Raymond Brian Harrington, Cordering (AU)

(73) Assignee: Grains Research and Development Corporation, Barton, ACT (AU)

( * ) Notice: Subject to any disclaimer, the term of this patent is extended or adjusted under 35 U.S.C. 154(b) by 0 days.

(21) Appl. No.: 12/866,238

(22) PCT Filed: Feb. 13, 2009

(86) PCT No.: PCT/AU2009/000173
§ 371 (c)(1),
(2), (4) Date: Nov. 10, 2010

(87) PCT Pub. No.: WO2009/100500
PCT Pub. Date: Aug. 20, 2009

(65) Prior Publication Data
US 2011/0059782 A1 Mar. 10, 2011

(30) Foreign Application Priority Data
Feb. 13, 2008 (AU) ............................... 2008900684

(51) Int. Cl.
*A01F 12/30* (2006.01)

(52) U.S. Cl. .................................................... 460/111

(58) Field of Classification Search ................ 460/111, 460/112, 102, 12, 149; 241/89.1, 32, 34, 241/55, 68, 278.1, 139.2, 187
See application file for complete search history.

(56) References Cited

U.S. PATENT DOCUMENTS

| 3,448,933 A | 6/1969 | Roy |
| 3,894,695 A | 7/1975 | Benedikter |
| 4,813,619 A | 3/1989 | Tjumanok et al. |
| 5,059,154 A | 10/1991 | Reyenga |
| 5,794,423 A * | 8/1998 | McLeod ..................... 56/14.6 |
| 5,795,222 A | 8/1998 | McLeod |

(Continued)

FOREIGN PATENT DOCUMENTS
AU 199537966 A1 5/1996
(Continued)

OTHER PUBLICATIONS

Product Brochure for Cage Mills, Stedman, 1998-2010, accessed at http://cagemill.com/cagemill_app.htm.

(Continued)

*Primary Examiner* — Arpad Fabian-Kovacs
(74) *Attorney, Agent, or Firm* — Hultquist, PLLC; Kelly K. Reynolds; Steven J. Hultquist (57) ABSTRACT

A method of harvesting crop material includes gathering the crop material and separating chaff material, and subjecting the chaff material to fragmentation in a cage mill to destroy unwanted seed material contained therein. Also provided is a mobile agricultural apparatus which travels with a harvesting machine during a harvesting operation to receive chaff material produced during the harvesting operation. At least one cage mill having rotors for fragmentation of the chaff material is included with the mobile apparatus, to destroy unwanted seed material contained therein. Such a cage mill includes at least a casing defining a milling zone, a rotor for performing milling, an inlet for introducing material for reduction into the milling zone, an outlet for removal of material from the milling zone, and an airflow through the milling zone to assist movement of the material through the milling zone from the inlet to the outlet.

7 Claims, 6 Drawing Sheets

U.S. PATENT DOCUMENTS

| | | | |
|---|---|---|---|
| 5,827,299 A | 10/1998 | Thomason et al. | |
| 5,989,614 A * | 11/1999 | Zittel | 426/481 |
| 6,238,286 B1 | 5/2001 | Aubry et al. | |
| 6,966,506 B2 | 11/2005 | McLeod et al. | |
| 2002/0151336 A1* | 10/2002 | McLeod et al. | 460/12 |
| 2003/0022706 A1* | 1/2003 | McLeod | 460/12 |
| 2011/0059782 A1* | 3/2011 | Harrington | 460/149 |

FOREIGN PATENT DOCUMENTS

| | | |
|---|---|---|
| AU | 199671759 A1 | 5/1997 |
| AU | 200138781 B2 | 3/2004 |
| DE | 3317613 A1 | 12/1983 |
| GB | 191274 A | 1/1923 |
| GB | 368106 A | 3/1932 |
| GB | 689936 A | 4/1953 |
| SU | 728911 A | 4/1980 |
| WO | 03101181 A2 | 12/2003 |

OTHER PUBLICATIONS

Written Opinion of PCTAU20090017 including English language description of SU728911, pp. 7-8, Feb. 15, 2010.

* cited by examiner

WEED AND VOLUNTEER CROP SEED DESTRUCTION

CROSS-REFERENCE TO RELATED APPLICATIONS

This is a U.S. national phase under the provisions of 35 U.S.C. §371 of International Patent Application No. PCT/AU09/00173 filed Feb. 13, 2009, which in turn claims priority of Australian Patent Application No. 2008900684 filed Feb. 13, 2008. The disclosures of such international application and Australian priority patent application are hereby incorporated herein by reference in their respective entireties, for all purposes.

FIELD OF THE INVENTION

This invention relates to harvesting of crop materials and also treatment of harvest crop residue material produced in a harvesting operation, to destroy weed seeds and potential volunteer grain seed material contained therein.

The invention also relates to a mill for reducing frangible material, and in particular a cage mill for reducing crop residue material and destroying seeds, particularly weed seeds.

BACKGROUND ART

The following discussion of the background art is intended to facilitate an understanding of the present invention only. The discussion is not an acknowledgement or admission that any of the material referred to is or was part of the common general knowledge as at the priority date of the application.

Weeds can compete with productive crops and so weed control is an important aspect of crop farming. In crop farming, there have been various ways in which weed control can be achieved, including ploughing and use of herbicides. Ploughing can damage fragile soil and so in more recent times there has been a trend towards use of herbicides. There is now, however, an increasing concern about the use of herbicides and the potential for weed resistance to them.

Genetically modified crops containing herbicide resistance also offer increased risk to the farming system by reducing the ability to control subsequent volunteer populations in the absence complete destruction of crop residue grain contained within harvest waste streams.

There is a need for an effective, efficient, harvester mounted, non-chemical, mechanical method for weed and volunteer grain seed control which does not involve the use of herbicides, or at least reduces the extent of use of herbicides.

DISCLOSURE OF THE INVENTION

According to a first aspect of the invention there is provided a method of harvesting crop material comprising gathering a crop material from a ground and separating crop residue, and subjecting the crop residue material to fragmentation in a cage mill to destroy unwanted seed material contained therein.

Preferably, the crop residue material is conveyed through the cage mill via an air flow.

Preferably, the air flow is established by rotation of the cage mill.

Preferably, the fragmented crop residue material and the destroyed unwanted seed material is returned to the ground.

Preferably, the fragmented crop residue material and the destroyed unwanted seed material is dispersed onto the ground.

According to a second aspect of the invention there is provided an agricultural apparatus comprising an apparatus adapted to travel on the ground with a harvesting machine during a harvesting operation to receive crop residue material produced during the harvesting operation, the apparatus comprising at least one cage mill having a plurality of rotors for fragmentation of the crop residue material to destroy unwanted seed material contained therein.

Preferably, the cage mill is adapted to generate an airflow upon rotation of the at least one of the rotors for conveying the crop residue material through the cage mill.

Preferably, the rotors comprise first and second rotors adapted to rotate with respect to each other.

Preferably, the first and second rotors are arranged for counter rotation.

Preferably, the first and second rotors comprises a plurality of impact elements arranged in circular concentric arrays.

Preferably, first and second are rotors configured in intermeshing relationship with respect to each other.

Preferably, at least one of the rotors comprises means for generating the air flow.

Preferably, the means for generating the air flow comprise at least one vane provided on the at least one rotor.

Preferably, the vane comprises an element presenting a broad face to oncoming air to generate air flow.

Preferably, the cage mill further comprises means for interrupting the rotary circulation of the crop residue material within the cage mill, the interrupting means disposed at an inner region of the rotor means.

Preferably, the apparatus further comprising outlet means for returning the fragmented crop residue material and the destroyed unwanted seed material to the ground.

Preferably, the outlet means comprise means for dispersing the fragmented crop residue material and the destroyed unwanted seed material on the ground.

Preferably, the apparatus further comprises a conveyer comprising an inlet for receiving harvesting material from the harvesting machine and an outlet for discharging the harvesting material on the ground.

Preferably, the apparatus comprises a mobile apparatus adapted to be towed behind the harvesting machine.

According to a third aspect of the invention there is provided a mill for fragmenting crop residue material to destroy unwanted seed material contained therein, the mill comprising a casing defining a milling zone, a rotor means within the milling zone for performing a milling operation, an inlet for introducing material for reduction into the milling zone, an outlet for removal of material from the milling zone, and means associated with the rotor means for generating an airflow through the milling zone to assist movement of the material through the milling zone from the inlet to the outlet.

Preferably, the rotor means comprise first and second rotors adapted to rotate with respect to each other.

Preferably, the first and second rotors are arranged for counter rotation.

Preferably, each of the first and second rotors comprise a plurality of elements arranged in circular concentric arrays.

Preferably, first and second are rotors configured in intermeshing relationship with respect to each other.

Preferably, at least one of the rotors provides the means for generating the air flow.

Preferably, the means for generating the air flow comprises at least one vane provided on the at least one rotor.

Preferably, the vane comprise an element presenting a broad face to oncoming air to generate air flow.

Preferably, the cage mill further comprising means for interrupting the rotary circulation of the crop residue material within the cage mill, the interrupting means disposed at an inner region of the rotor means.

According to a fourth aspect of the invention there is provided a mill for fragmenting frangible material, the mill comprising a casing defining a milling zone, a rotor means within the milling zone for performing a milling operation, an inlet for introducing material for reduction into the milling zone, an outlet for removal of material from the milling zone, and means associated with the rotor means for generating an airflow through the milling zone to assist movement of the material through the milling zone from the inlet to the outlet.

According to a fifth aspect of the invention there is provided a method of subjecting a crop residue material to fragmentation comprising delivering the crop residue material to a milling zone comprising at least one cage mill and fragmenting the crop residue material during rotation of the at least one cage mill.

Preferably, the step of fragmenting the crop residue material comprises the destruction of unwanted seed material.

BRIEF DESCRIPTION OF THE DRAWINGS

The invention will be better understood by reference to the following description of one specific embodiment thereof as shown in the accompanying drawings in which.

BEST MODES FOR CARRYING OUT THE INVENTION

The embodiment shown in the drawings is directed to an apparatus 11 for use, for example, in conjunction with a harvester 13 in harvesting crop material such as wheat. It is common for crop material to contain unwanted weeds (such as rye grass) which are collected with the crop material during the harvesting operation. In the harvesting operation, the collected material is typically separated into seed from the grain crop, straw and chaff material. It is common for seeds from the unwanted weeds and a small proportion of grain to be incorporated in the crop residue material. In circumstances where the crop residue material is returned to the ground, there is an opportunity for the weed and grain seeds to germinate, thereby leading to the generation of weeds and volunteer crop in subsequent crops.

The apparatus 11 according to this embodiment is arranged to reduce the crop residue material and in doing so destroy the seeds of the unwanted weeds and grain. In this way, when the milled crop residue material returns to the ground the cycle of weed generation is interrupted and volunteer crop is reduced.

The harvester 13 operates in conventional manner and separates the harvested crop material into grain, straw and chaff material.

According to a first embodiment of the invention the apparatus 11 comprises a mobile structure 15 adapted to be towed behind the harvester 13. The apparatus 11 may be a separate unit which can be detachably coupled to the harvester when required for use. Alternatively, according to a second embodiment of the invention apparatus 11 can be formed integrally with the harvester 13.

Figure 1:
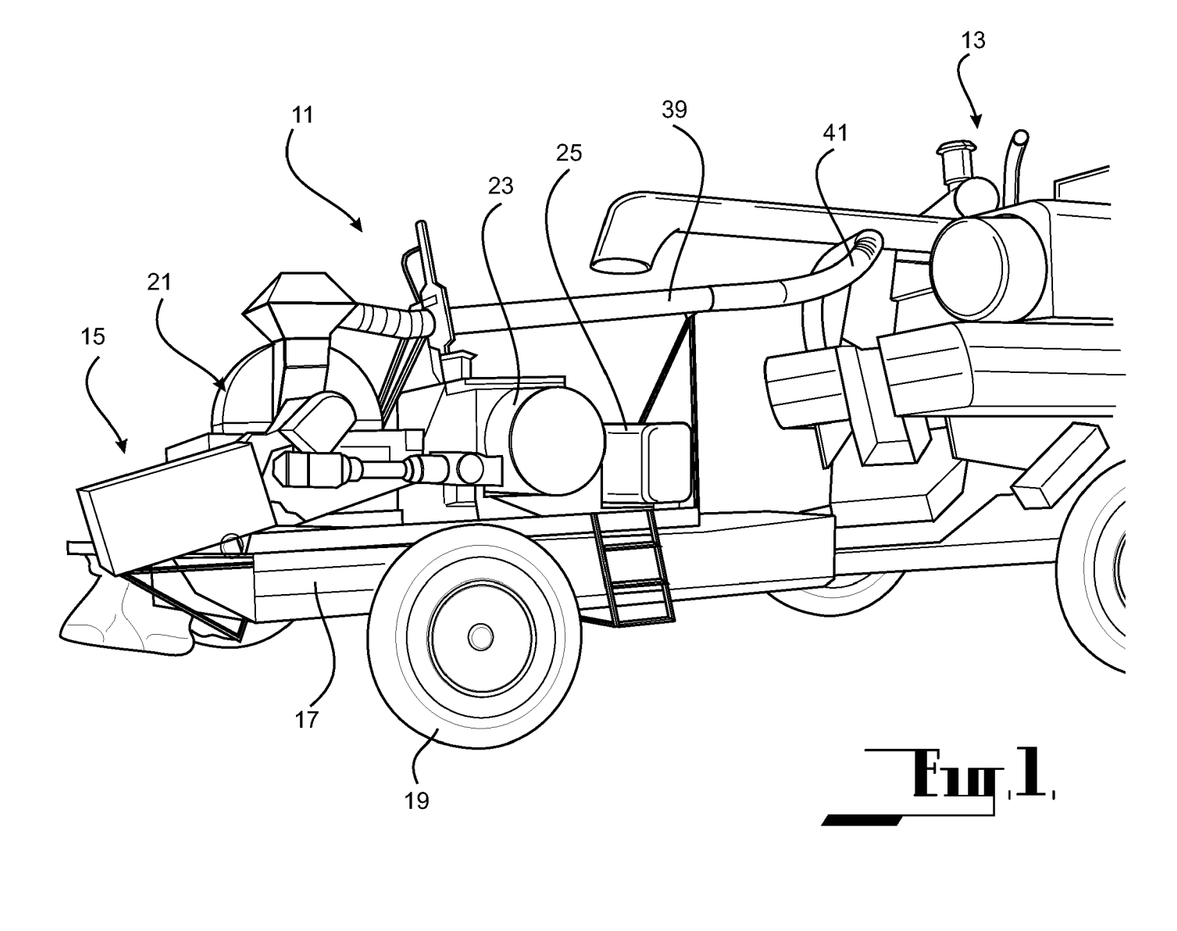
FIG. 1 is a detail of a perspective view of an apparatus according to the first embodiment attached to a harvester.
Figure 2:
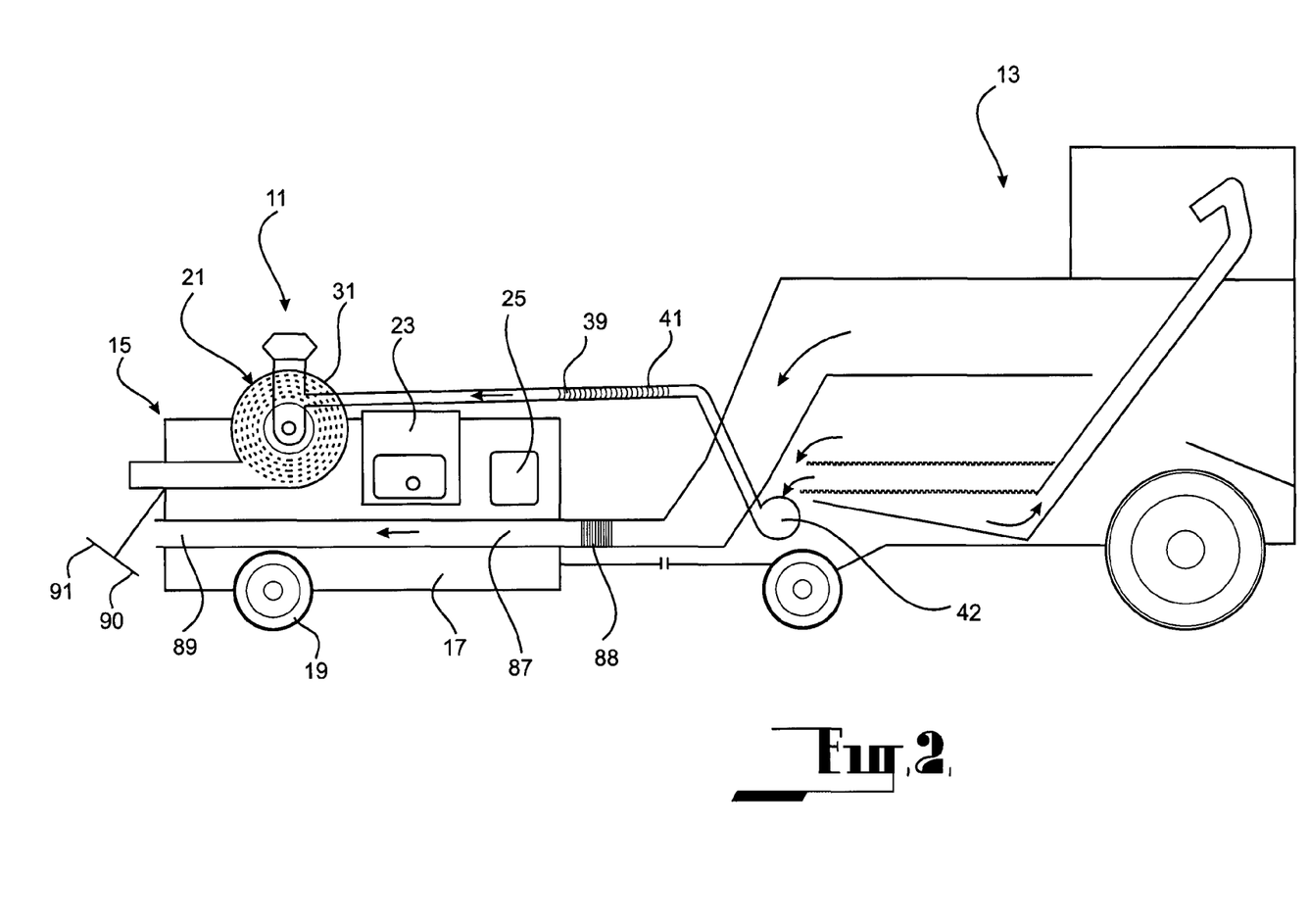
FIG. 2 is a schematic side view of the arrangement shown in FIG. 1.

FIGS. 1 and 2 show a first embodiment of the invention wherein the apparatus 11 is coupled to the harvester 13. The mobile structure 15 comprises a frame structure 17 supported on ground wheels 19. The frame structure 17 carries a milling apparatus 21 driven by a motor 23 also carried on the frame structure 17. Typically, the motor 23 comprises an internal combustion engine which receives fuel from a fuel tank 25 also carried on the frame structure 17.

The milling apparatus 21 is configured as cage mill 21. The cage mill 21 is adapted to generate an airflow for conveying the crop residue material through the milling zone.

The cage mill 21 comprises a housing 31 which defines a milling chamber 33 therein. The housing 33 has an inlet 35 through which crop residue material for milling is delivered to the milling zone 33 and an outlet 37 from which milled crop residue material is discharged from the milling zone 33. As will be explained in more detail, an airflow is generated for conveying the crop residue material through the milling zone from the inlet to the outlet.

In the arrangement shown, the crop residue material is delivered to the inlet 35 along a crop residue transfer duct 39 extending from the harvester 13 to the cage mill 21. The crop residue transfer duct 39 with supplementary fan driven air assistance incorporates a flexible section 41 adapted to accommodate relative movement between the trailing mobile structure 15 and the harvester 13. Such movement can arise during cornering and also as a result of traversing uneven terrain. The supplementary fan driven air assistance is accomplished via a fan system 42 adapted to deliver the crop residue material to the transfer duct 39.

A rotor means 50 is provided within the milling zone 33 for milling the crop residue material received from the harvester 13. The rotor means 50 comprises a first rotor 51 and a second rotor 52, the two rotors being in intermeshing relationship.

The first rotor 51 is driven by a first drive shaft 53 and the second rotor 52 is driven by a second drive shaft 55. The two drive shafts 53, 55 receive drive transmitted from the motor 23, the drive transmission arrangement being such that the two drive shafts rotate in opposite directions. In this way, the two rotors 51, 52 undergo counter-rotation.

The first rotor 51 comprises a support 55 mounted on the drive shaft 53 for rotation therewith. In the arrangement illustrated, the support 55 comprises a disk 57.

Figures 3, 4:
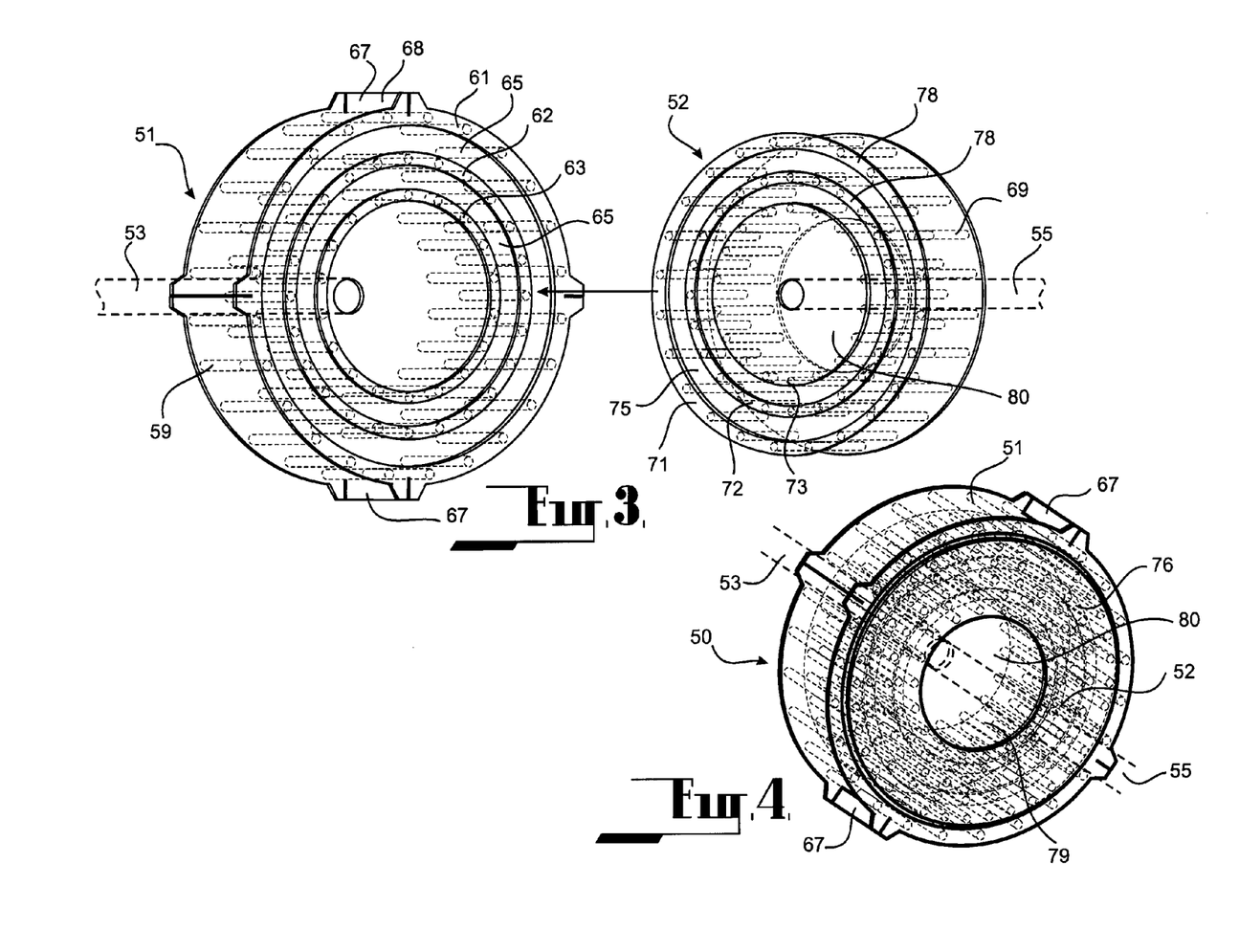
FIG. 3 is an exploded view of a rotor means forming part of the apparatus according to the first embodiment, the rotor means comprising two rotors.
FIG. 4 is a schematic prospective view of the rotor means, with the two rotors being in intermeshing relation.

The first rotor 51 further comprises a plurality of elongate impact elements 59 arranged in arrays 60. In the arrangement illustrated, there are three arrays, 61, 62 and 63. In each array 60, the elongate elements 59 are arranged a circular configuration in circumferentially spaced apart relationship, as best seen in FIG. 3. The three arrays 61, 62, 63 are disposed in spaced apart concentric relationship about the axis of rotation of the rotor 51. With this arrangement, there is an annular space 65 provided between each circular array.

In this arrangement, the elongate elements 59 comprise rods of circular cross section, with one end of each rod being attached to the disk 57. The other end of the rods in each array are interconnected by a supporting circular band 66, also as best seen in FIG. 3.

The outermost circular band 66a on the rotor 51 incorporates a plurality of circumferentially spaced vanes 67. In the arrangement illustrated, there are four vanes 67. Each vane 67 comprises a blade 68 supported between the disk 57 and the outer most band 66a.

The vanes 67 are adapted to generate airflow through the milling chamber 33 from the inlet 35 to the outlet 37 upon rotation of the rotor 51.

The second rotor 52 further comprises a plurality of circular elements 69 arranged in arrays 70. The elongate elements 69 comprise rods. In the arrangement illustrated, there are three arrays, 71, 72 and 73. In each array 70, the elongate elements 69 are arranged a circular configuration in circumferentially spaced apart relationship, as best seen in FIG. 3. The three arrays 71, 72, 73 are disposed in spaced apart concentric relationship about the axis of rotation of the rotor 52. With this arrangement, there is an annular space 75 provided between each circular array.

The elongate elements 69 are supported at one end on an outer support disk 76. The outer support disk 76 defines a central opening 77, the purpose of which will be explained later. The other end of the elongate elements 69 in each array 70 are interconnected by a supporting circular band 78, also as best seen in FIG. 3.

The inner array 73 is supported at the other end on a support 76 mounted on the drive shaft 55. The support 76 is configured as an outer disk 79. With this arrangement, the elongated elements 69 are supported for rotation with the second drive shaft 53, the elongated elements in the inner array 73 being supported on the inner disk 79 and the elongated elements in the other arrays 72, 73 being supported on the annular outer disk 76 which in turn is supported on the elongate elements 69 of the inner array 73.

Figure 5:
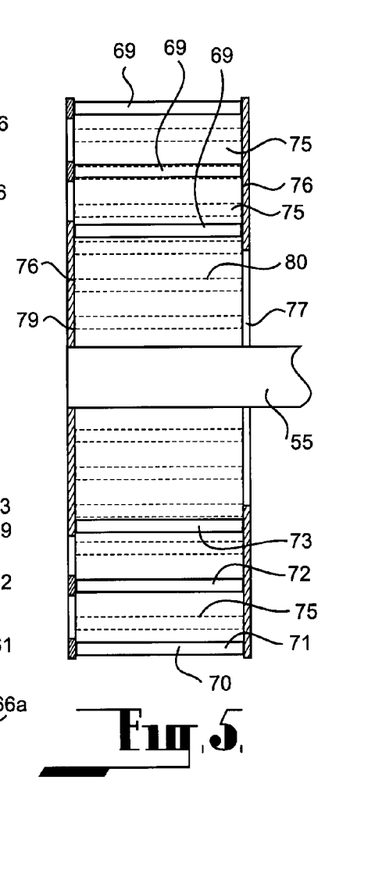
FIG. 5 is a schematic side view of the rotor means in an exploded condition, showing the two rotors apart.
Figure 6:
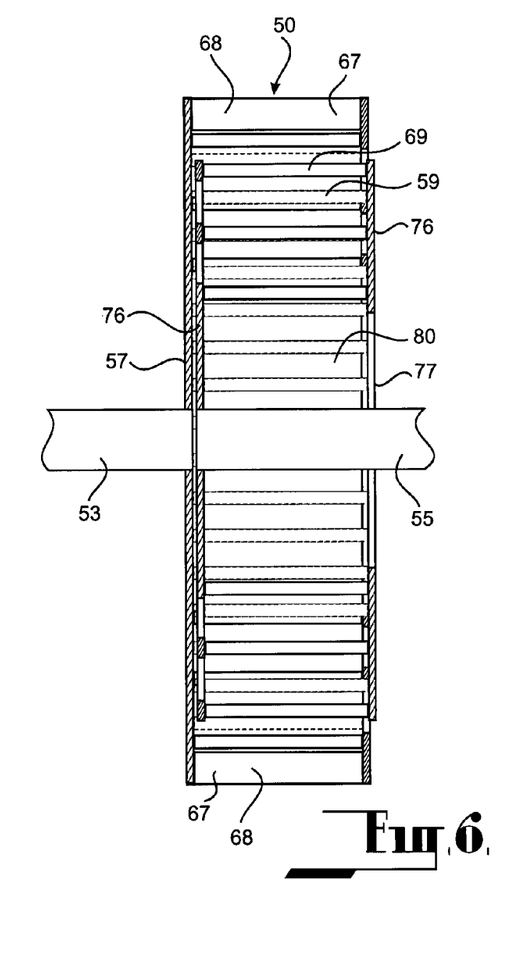
FIG. 6 is a schematic side view of the rotor means, with the two rotors being shown in intermeshing relation.
Figure 7:
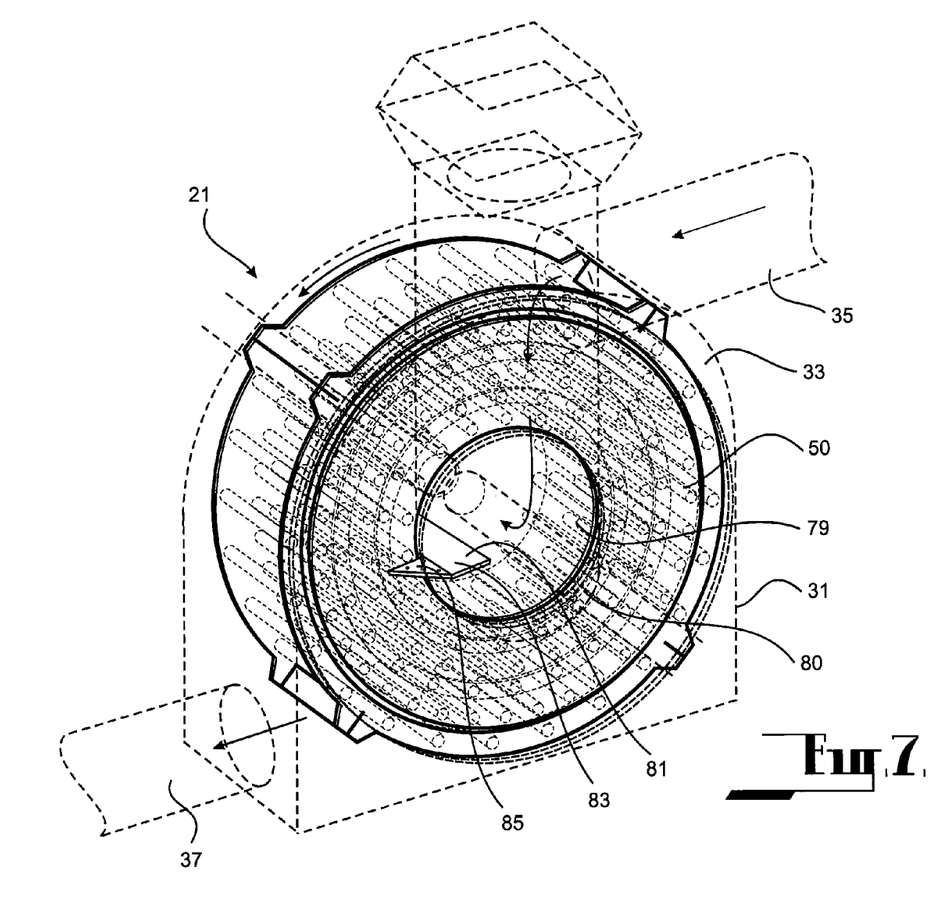
FIG. 7 is a schematic perspective view of part of the apparatus, showing in particular the rotor assembly at the milling zone, as well as the associated inlet and outlet.
Figure 8:
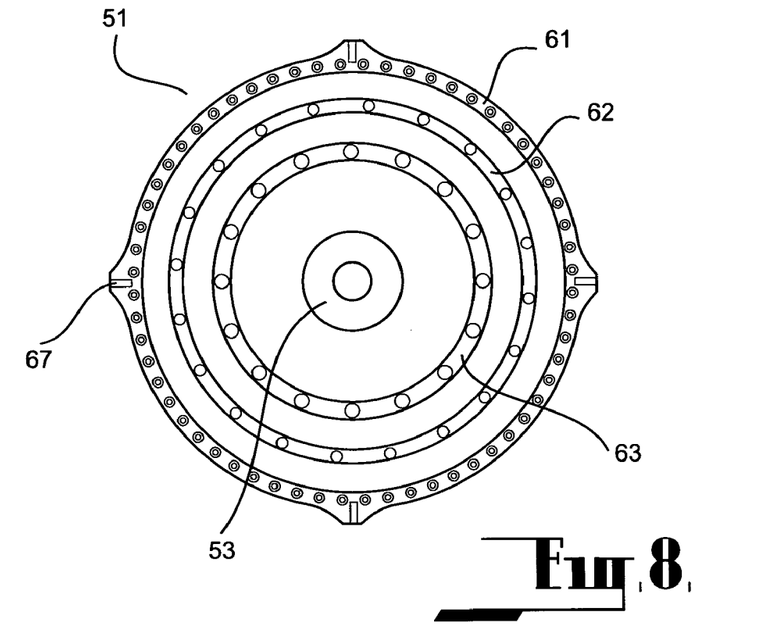
FIG. 8 is a end view of the first rotor.
Figure 9:
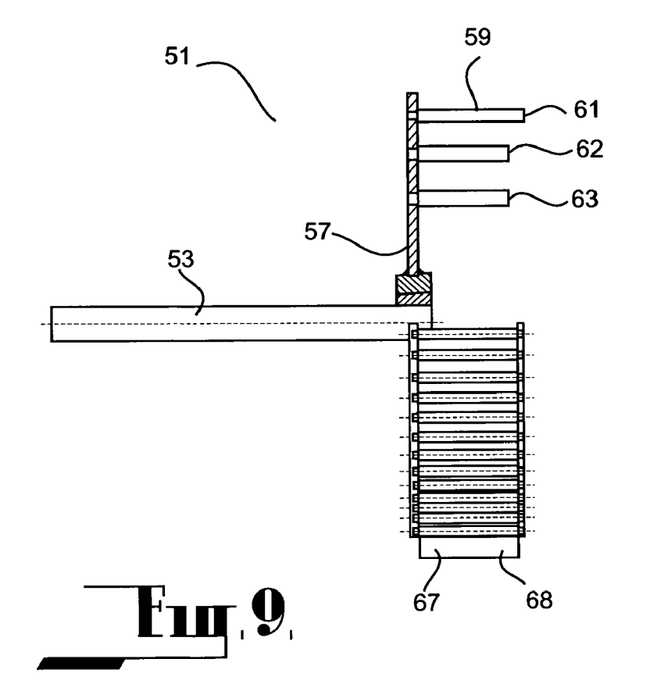
FIG. 9 is a half section of the first rotor.

The two rotors 51, 52 are in opposing relation, as best seen in FIG. 5. The arrays 60, 70 in the two rotors are in offset relationship such the circular arrays of one rotor are aligned with the annular spaces of the other rotor. With this arrangement, the two rotors can intermesh as shown in FIG. 6, with the support elements 59 in the annular arrays 60 of the first rotor 51 being located in the annular spaces 75 within the second rotor 52, and correspondingly the support elements 69 in the arrays 70 of the second rotor 52 being located in the annular spaces 65 within the first rotor 51.

With this arrangement, the support elements in the arrays 60, 70, move in circular paths without contacting the elongate elements of adjacent arrays.

The central opening 77 within the second rotor 52 communicates with the inlet 35 and provide a delivery port through with crop residue material can be introduced into the milling zone. In particular, the crop residue material is introduced into the inner region 80 of the second rotor 52 about the drive shaft 55. The air flow induced in the milling zone causes the introduced crop residue material to migrate radically outwardly towards the outer periphery of the casing, from where it can flow towards the outlet 37. In moving radically outwardly from the inner region 80, the crop residue material is required to follow a path which is intersected multiple times by the rotating circular arrays 60, 70. Consequently, the crop residue material is struck by the rotating elongate elements 59, 69 and subjected to a hammering action. This causes the crop residue material to be milled, so destroying any seed material contained therein. The extent of the milling process can be dependent upon the number of arrays 60, 70, as well as the speed of rotation.

From the milling chamber 33, the milled crop residue material is discharged through outlet 37 to the rear of the mobile structure 15.

There is a prospect of some crop residue material remaining resident within the inner region 80, so causing a blockage rather than travelling radically outwardly through the counter rotating rotors. With a view to avoiding such an occurrence, means 81 are provided for preventing the crop residue material from merely circulating within the inner region 80 of the rotor means. In the arrangement illustrated, the means 81 comprises an interrupter bar 83. The interceptor bar 83 is mounted at one end on a mounting bracket 85 attached to an adjacent wall of the housing 31. With this arrangement, the interrupter bar 83 extends into the inner region 80 of the milling zone through the circular hole 77 within the rotor 52. The interrupter bar 83 functions as a barrier to prevent mere circulation of the introduced crop residue material with inner region 80.

The discharging crop residue material is distributed on the ground. For this purpose, a distributor head 90 may be provided to assist in the distribution process. The distributor head 90 may comprise a rotating distributor element 91 which is contacted by the discharging the crop residue material, causing the crop residue material to be distributed over the ground as the mobile structure 15 advances.

With the harvester 13, straw material is normally discharged at the rear thereof. This can present some problems for the trailing mobile structure 15 travelling behind the harvester 13. For this purpose, according to this arrangement the mobile structure 15 may be provided with a straw conveyor 87 having an inlet end 88 and a discharge end 89. The inlet end 88 of the conveyor 87 is adapted to receive straw material from the harvester. The received straw material is transferred along the conveyor 87 to the discharge end 89 at which it is then discharged onto the ground. In this way, the straw is discharged rearwardly of the mobile structure 15 so as not to cause interference to the operation thereof.

Alternatively, according to another arrangement the straw material is delivered to the inlet 35 along a crop residue transfer duct 39 extending from the harvester 13 to the cage mill 21. This allows for the fragmentation of the straw material for easy dispersion of the straw material when returning it to the ground. In this arrangement conveyor 87 may be omitted.

As said before, according to a second embodiment of the invention apparatus 11, comprising cage mill 21, can be formed integrally with the harvester 13. In this second embodiment the crop residue may be delivered from the harvester outlet to the inlet 35 without supplementary fan driven air assistance. Thus, fan system 42 may be omitted. Moreover, straw material product of the harvesting operation may be discharged at the rear of the harvester 13 to the ground without any fragmentation. Alternatively, the straw material may be delivered to apparatus 11 comprising cage mill 11 for fragmentation thereof and subsequent dispersion onto the ground. From the foregoing, it is evident the present invention provides a simple yet highly effective arrangement for destroying seeds in crop residue material produced in a cropping operation. The use of the cage mill 21 for fragmenting the crop residue material is particularly advantageous. By using a cage mill higher energy efficiencies can be achieved as opposed to other milling apparatus such as a roller mill or a hammer mill. Further, a cage mill is able to accommodate a higher capacity of crop residue material flow through the mill as compared to a roller mill or a hammer mill. Still further, a cage mill is particularly effective in weed seed destruction, and it is believed that an efficacy in the order of 98% weed seed destruction can be attained. With efficacy at the level, use of herbicides can be potentially reduced.

It should be appreciated that the scope of the invention is not limited to the scope of the embodiment described. In the embodiment, the two rotors 51, 52 are driven by drive shafts 53, 54 disposed on opposed sides of the rotor means. In another arrangement, the two shafts may be disposed on the same side of the rotor means. With such an arrangement, one shaft may comprise a hollow outer shaft and the other shaft may comprise an inner shaft disposed concentrically within the outer shaft. With such an arrangement, drive would be transmitted to the inner and outer shafts causing them to rotate in opposed directions, so producing counter-rotation of the two rotors as previously explained.

Moreover, the apparatus 11 may be used separately from the harvester. In this case, crop residue material is delivered from, for example, the harvesting area to the location of the apparatus 11 in order to proceed with the fragmentation process of the chaff material and the subsequent seed destruction. The fragmented crop residue, material may be used for other purposes or returned to the harvesting location.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The claim defining the invention is as follows:

1. A method of harvesting crop material comprising gathering a crop material from a ground and separating crop residue material, and subjecting the crop residue material to rotary circulation within a cage mill for fragmentation of the crop residue material to destroy unwanted seed material contained therein, the rotary circulation of the crop residue material comprising intermeshed rotation of a plurality of rotors within the cage mill, and wherein the rotary circulation of the crop residue material is interrupted by interrupting means located at an inner region of the cage mill.

2. A method according to claim 1 wherein the crop residue material is conveyed through the cage mill via an air flow.

3. A method according to claim 2 wherein the air flow is established by the rotary circulation within the cage mill.

4. A method according to claim 1 wherein the fragmented crop residue material and the destroyed unwanted seed material is returned to the ground.

5. A method according to claim 4 wherein the fragmented crop residue material and the destroyed unwanted seed material is dispersed onto the ground.

6. A method according to claim 1 wherein the crop residue material comprises straw.

7. The method of claim 3, wherein at least one of the plurality of rotors comprises at least one vane as a means for generating the air flow.

* * * * *